Figure 1:
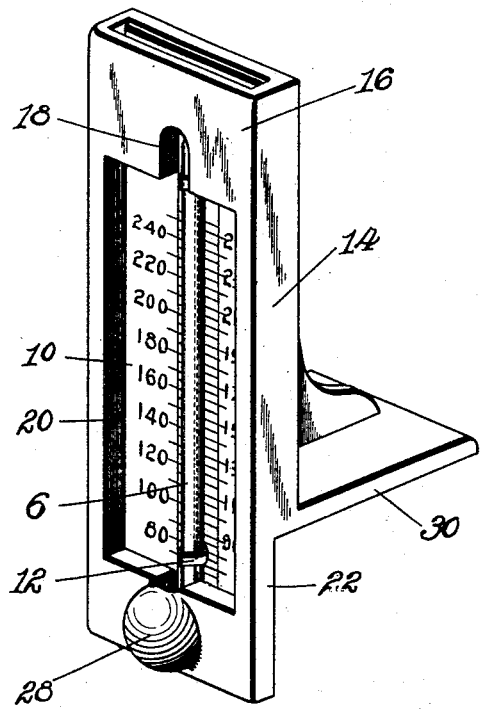

Feb. 18, 1930.  O. H. BROWN  1,747,222
THERMOMETER MOUNTING
Filed July 29, 1922

INVENTOR
Oscar H. Brown
By his Attorneys
Nelson H. Howard

Patented Feb. 18, 1930

1,747,222

UNITED STATES PATENT OFFICE

OSCAR H. BROWN, OF SALEM, MASSACHUSETTS, ASSIGNOR TO THE TURNER TANNING MACHINERY COMPANY, OF PEABODY, MASSACHUSETTS, A CORPORATION OF MAINE

THERMOMETER MOUNTING

Application filed July 29, 1922. Serial No. 578,423.

This invention relates to improvements in thermometric devices for determining the temperature of heated surfaces.

It is an object of the invention to provide improved means for mounting a thermometer so that the latter will be properly protected against the possibility of breakage while it is being applied directly to a heated surface. It is a further object of the invention to provide improved means for applying a thermometer bulb directly to a heated surface to be tested in such a way that it may adjust itself to the surface presented and be accommodated to movement or vibration of the parts of mechanisms or machines in operation.

In one aspect the invention resides in a casing for a thermometer constructed to receive and protect the thermometer and its bulb, the arrangement being such that the bulb of the thermometer normally projects from the casing and is allowed to enter the casing when the casing and the bulb are pressed against a surface of an object to be tested.

In the illustrated construction, a casing is provided with a recess into which the bulb of the thermometer may be pressed against the action of a spring which normally keeps the bulb protected from the casing so that it may contact with any selected part of a heated surface.

As shown, a thermometer is mounted in a portable casing having parts angularly related to each other to engage different parts of the surface of the object to be tested so that one part serves as a gage for an angularly related part whereby the bulb of the thermometer can always be made to contact with substantially the same portion of the surface to be tested, thus insuring greater accuracy in arriving at determinations as to the temperature of a heated surface when readings are taken at intervals through successive applications of a portable thermometer.

These and other features of the invention and details of construction will now be described in detail and pointed out more particularly in the appended claims.

Figure 2:
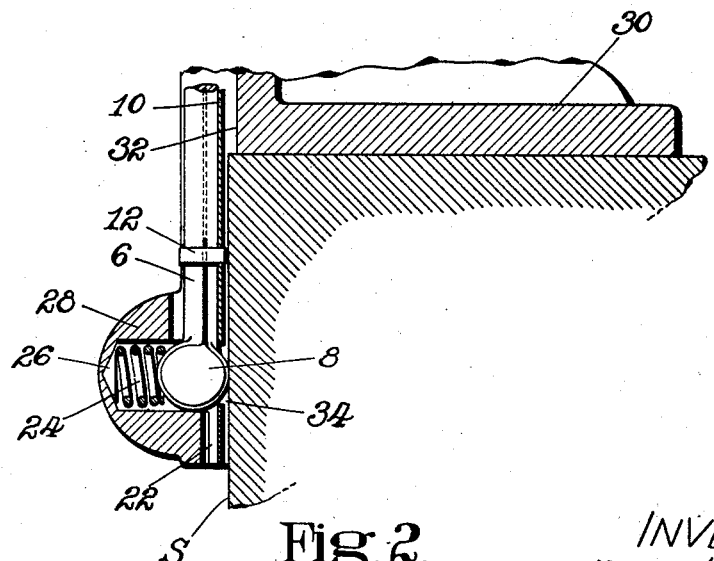

In the drawings,

Fig. 1 is a view in perspective of a thermometer and its illustrated mounting; and Fig. 2 is a detail view partly in section showing the thermometer applied to a surface of a rectangular member or object.

In the illustrated device a thermometer 6 of an ordinary and well-known type and having a bulb 8 more or less spherical in form is secured to a plate 10 by means of clips 12 which embrace the thermometer stem and pass through openings in the plate 10 where the ends of each clip are bent to engage the inner surface of the plate in a manner similar to the retaining portions of a McGill fastening. It is to be understood, of course, that other means of securing the thermometer to the plate may be employed, although the clip shown is advantageous in that it provides means for retaining the thermometer and plate in the casing as will hereinafter be pointed out. For supporting the assembled thermometer and plate there is provided a casing 14 which may be of wood or metal or any other suitable material. The casing is constructed to provide a box-like portion 16 at its upper end for receiving the upper end of the plate 10, the front wall of the portion 16 being cut away, as at 18, to accommodate the upper end of the thermometer. All of the intermediate portions of the box-like casing or housing 14 is cut away on one face as at 20, to expose the stem of the thermometer and the intermediate portion of the plate 10 which carries a scale comprising numbers which indicate temperature units, the thermometer and the plate being properly adjusted to each other so that the readings on the face of the member 10 correctly indicate the temperatures recorded by the thermometer. It will be understood that the scale may be on the thermometer stem and that means equivalent to the plate 10 may be utilized to assemble the thermometer with the casing 14. As shown in Fig. 2, the rear part of the casing 14 is cut away at its lower end on the face opposite to that shown in Fig. 1 to expose the thermometer on this surface of the casing so that it may be pressed against the surface of the article or object, the temperature of which it is desired to ascertain. At this cut-away part, however, the casing provides a recess which is conveniently rectangular in cross-section and deep enough to accommodate both the plate and the thermometer. Hence, when this portion of the casing is pressed against the surface S of the object, the plate and thermometer are pressed back into the casing, as indicated in Fig. 2, being protected by flanges or side walls 22 of the recess enclosing the lower end of the thermometer. From another standpoint the walls or flanges 22 form protecting portions of the casing serving to contact with the heated surface to be tested and to enclose the thermometer and protect it against further pressure when it has retreated or been pressed back beyond the plane of the rear surfaces of the flanges 22. In the illustrated construction, spring means is provided for projecting a portion of the thermometer bulb beyond the casing and as shown this means comprises a spring 24 seated in a socket 26 provided in a boss 28 on the lower end of the casing 14. Normally, this spring operates to project the bulb 8 beyond the plane defined by the rear faces of the flanges 22 so that the bulb will contact with the surface S or any similar surface and be held yieldingly against the surface while the casing is held firmly pressed against the said surface. It will be clear from an inspection of Fig. 2 that a surface on the thermometer bulb 8 is kept against the surface to be tested by the spring 24 which, at the same time, serves to permit yielding of the bulb during vibration of the surface to be tested if such be a part of a machine in operation. A very important purpose of the yielding mounting for the thermometer bulb, however is to secure a sufficiently firm contact of the bulb with the surface to be tested for all practical purposes without subjecting the bulb to the danger of breakage in applying it to the surface to be tested.

In the construction shown, the casing 14 is provided with a rearward extension 30 which may be at a right angle to the flanges 22 and which serves to locate the bulb of a thermometer always at a given distance from an accessible edge portion of the object being tested, this being an advantage in securing temperatures on a part of the machine or container which is frequently tested for the purposes of comparison and regulation of the temperature.

In assembling the parts of the device, the plate 10 with the thermometer attached thereto is entered into the casing 14 from the lower end thereof and is slidably engaged with the passageway in the casing and is moved therein until the upper end of the plate occupies the position shown in Fig. 1 of the drawings. Previous to the insertion of the plate and thermometer, the spring 24 has been introduced into the socket 26, and it is necessary only to hold the spring compressed in its socket by a suitable tool until the thermometer bulb is engaged with its outer end, the end of the spring forming a partial socket which engages with the convex surface of the bulb. The spring pushes the assembled plate and thermometer against the rear face 32 of the recessed portion 20 and serves to maintain them in the casing. However, if the plate and thermometer should move in a downward direction in spite of the pressure of the spring 24, the curved part of the clip 12 will engage with the spring and prevent accidental separation of the assembled plate and thermometer from the casing. In the illustrated construction, the plate 10 is provided with a circular recess at 34 to receive a portion of the bulb 8 thus assisting the clips 12 in holding the thermometer assembled with the plate 10. In this way, also, the bulb 8 is enabled to contact directly with the surface S of the object to be tested. If desired, the plate may be constructed to terminate just above the bulb 8 in which case the securing means 12 may be depended upon to hold the thermometer and plate securely attached to each other.

In employing the device for ascertaining the temperature of a heated surface, the casing is applied to the object or part of the machine by placing the under surface of the extension 30 upon one part or surface of the object and then sliding the whole casing along upon said surface until the flanges 22 of the casing contact firmly with the same or another surface of the object, in which operation the thermometer bulb 8 is pressed yieldingly against the surface to be tested. Inasmuch as the thermometer bulb contacts directly with the heated surface and is almost completely enclosed by portions of the casing, the temperature of the surface will be registered by the thermometer with sufficient accuracy for all ordinary purposes. If desired, of course, the device illustrated can easily be tested to determine the amount of error as compared with the actual temperature of a surface obtained in a more painstaking manner and under conditions which it would be impractical even to approximate in the routine of factory operations, where the requirements are simplicity and speed in the frequent testings of the temperature of machine parts by workmen and others in charge of the machines. After the amount of error has once been ascertained it is a simple matter to add this amount to the temperature obtained by the illustrated device. As a matter of fact, however, this would not be necessary from the practical standpoint, since it is sufficient to note within what limits the temperature of the surface should be kept as determined by the readings of the thermometer in the illustrated mounting.

Having thus described my invention, what

I claim as new and desire to secure by Letters Patent of the United States is:—

1. In a device of the character described, a thermometer, a casing for receiving the thermometer, said casing being provided with a recess into which the bulb of the thermometer may be pressed, and a spring normally operative to hold the thermometer with the larger part of its bulb out of the recess but adapted to yield to permit the bulb to enter the recess to a greater extent when the other side of the bulb is pressed against the surface of an object to be tested as to temperature.

2. In a device of the character described, a thermometer, a member having an opening to receive the bulb of the thermometer when the latter is attached to the member, a casing in which the assembled member and thermometer may be mounted, said casing having flanges and a recess therebetween for receiving the thermometer bulb, and a spring for pressing the bulb in a direction outwardly from the recess and into a position with a portion thereof projecting beyond the flanges and adapted to yield to permit one side of the bulb to enter the recess when the other side of the bulb and the flanges are pressed against an object to be tested.

3. In a device of the character described, a thermometer having a bulb, a portable casing for receiving and protecting the thermometer and its bulb and having an aperture in alignment with said bulb, and resilient means for pressing the thermometer bulb outwardly to project through said aperture.

4. In a device of the character described, a thermometer, a casing adapted to receive the thermometer and having portions for contacting with the surface to be tested and thus protecting the bulb of the thermometer, and a spring for holding the bulb with a portion thereof projected beyond the protecting portions of the casing and adapted to yield to permit the bulb to enter the casing when the bulb and the protecting portions of the casing are pressed against an object to be tested.

5. In a mounting for a thermometer, a plate member provided with a scale indicating temperature units and to which a thermometer may be fixedly attached, a casing for receiving the plate and attached thermometer, said casing being provided with a recess into which the bulb of the thermometer may be pressed, and a spring normally operative to hold the thermometer with the greater portion of its bulb out of the recess but adapted to yield to permit the bulb to enter to a greater extent into the recess when the other side of the bulb is pressed against the surface of an object to be tested as to temperature.

6. In a device of the character described, a thermometer, a member provided with a scale indicating temperature units and to which the thermometer is adapted to be fastened, a casing into which the assembled plate and thermometer may be slipped from one end, said casing having a recess for receiving a convex portion of the thermometer bulb, and a spring located in the recess for pressing the bulb outwardly therefrom into a position where a portion thereof projects from the casing, said spring being adapted to yield to permit one side of the bulb to enter the recess when the other side of the bulb is pressed against an object to be tested.

7. In a device of the character described, a thermometer, a member provided with a scale indicating temperature units and to which the thermometer is adapted to be securely attached, a portable casing for receiving the assembled thermometer and member, said casing having a recess for receiving the bulb of the thermometer and having a surface which, together with the recess, provides space sufficient to accommodate the thermometer bulb when the casing is pressed against an object so that the bulb will not be broken, and a spring for pressing the thermometer bulb outwardly from the recess with a portion thereof projecting beyond said surface and adapted to yield to permit one portion of the bulb to enter the recess when the opposite portion is pressed against an object to be tested.

8. In a device of the character described, a thermometer, a member provided with a scale indicating temperature units and to which the thermometer is adapted to be securely attached, the member having an opening through which a portion of the bulb of the thermometer projects, a portable casing adapted to receive the assembled thermometer and member and having a recess in alinement with the opening in said member for receiving a portion of the bulb of the thermometer, and a spring for holding the bulb with a portion thereof projecting out of the recess and adapted to yield to permit one side of the bulb to enter the recess when the other side is pressed against an object to be tested.

9. In a device of the character described, a thermometer, a portable casing for receiving the thermometer and having portions for protecting the thermometer bulb, said casing having a recess for accommodating the bulb of the thermometer, a spring for causing the bulb to project from the recess to contact directly with the surface to be tested, and means on the casing for locating the bulb of the thermometer with respect to the surface to be tested.

10. In a device of the character described, a thermometer, a portable casing for receiving the thermometer and having portions for protecting the thermometer bulb, said casing having a recess for accommodating the bulb of the thermometer, a spring for causing the bulb to project from the recess to contact directly with the surface to be tested, and gaging portions on the casing angularly related to each other for locating the bulb of the thermometer with respect to the surface to be tested.

In testimony whereof I have signed my name to this specification.

OSCAR H. BROWN.